United States Patent
Zhao et al.

(10) Patent No.: US 10,205,474 B2
(45) Date of Patent: *Feb. 12, 2019

(54) FACILITATING IN-DEVICE COEXISTENCE BETWEEN WIRELESS COMMUNICATION TECHNOLOGIES

(71) Applicant: Apple Inc., Cupertino, CA (US)

(72) Inventors: Wen Zhao, San Jose, CA (US); Paul V. Flynn, Menlo Park, CA (US); William S. Burchill, San Jose, CA (US); Vinay R. Majjigi, Sunnyvale, CA (US); Xiaowen Wang, Cupertino, CA (US); Syed A. Mujtaba, Santa Clara, CA (US); Kee-Bong Song, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,502

(22) Filed: Dec. 4, 2017

(65) Prior Publication Data

US 2018/0159570 A1 Jun. 7, 2018

Related U.S. Application Data

(63) Continuation of application No. 14/727,682, filed on Jun. 1, 2015, now Pat. No. 9,838,054, which is a
(Continued)

(51) Int. Cl.
*H04B 1/00* (2006.01)
*H04B 15/00* (2006.01)
(Continued)

(52) U.S. Cl.
CPC ........... *H04B 1/1081* (2013.01); *H04B 17/29* (2015.01); *H04L 47/14* (2013.01); *H04L 47/24* (2013.01);
(Continued)

(58) Field of Classification Search
None
See application file for complete search history.

(56) References Cited

U.S. PATENT DOCUMENTS 7,492,735 B2 2/2009 Zeira et al.
7,949,342 B2 5/2011 Cuffaro et al.
(Continued)

FOREIGN PATENT DOCUMENTS

JP 2006222665 A 8/2006
JP 2007522710 A 8/2007
(Continued)

OTHER PUBLICATIONS

PCT Application No. PCT/US2013/073947—International Search Report and Written Opinion dated Feb. 27, 2014.
(Continued)

*Primary Examiner* — Tuan A Tran
(74) *Attorney, Agent, or Firm* — Dickinson Wright RLLP

(57) ABSTRACT

A method for facilitating in-device coexistence between wireless communication technologies on a wireless communication device is provided. The method can include transmitting data traffic from the wireless communication device via an aggressor wireless communication technology; determining occurrence of an in-device interference condition resulting from transmission of the data traffic via the aggressor wireless communication technology interfering with concurrent data reception by the wireless communication device via a victim wireless communication technology; and reducing a bit rate of the data traffic transmitted via the aggressor wireless communication technology in response to the in-device interference condition.

20 Claims, 8 Drawing Sheets

Related U.S. Application Data continuation of application No. 13/909,298, filed on Jun. 4, 2013, now Pat. No. 9,049,747.

(60) Provisional application No. 61/769,144, filed on Feb. 25, 2013.

(51) Int. Cl.

| | | |
|---|---|---|
| *H04B 1/10* | (2006.01) | |
| *H04W 88/06* | (2009.01) | |
| *H04W 28/02* | (2009.01) | |
| *H04L 12/891* | (2013.01) | |
| *H04L 12/801* | (2013.01) | |
| *H04L 12/851* | (2013.01) | |
| *H04L 12/825* | (2013.01) | |
| *H04B 17/29* | (2015.01) | |
| *H04W 52/24* | (2009.01) | |
| *H04W 52/26* | (2009.01) | |
| *H04W 52/36* | (2009.01) | |
| *H04W 72/04* | (2009.01) | |

(52) U.S. Cl.
CPC .............. *H04L 47/25* (2013.01); *H04L 47/41* (2013.01); *H04W 28/0236* (2013.01); *H04W 52/243* (2013.01); *H04W 52/265* (2013.01); *H04W 52/267* (2013.01); *H04W 52/36* (2013.01); *H04W 72/0413* (2013.01); *H04W 88/06* (2013.01)

(56) References Cited

U.S. PATENT DOCUMENTS

| | | | |
|---|---|---|---|
| 8,400,950 B2 | 3/2013 | Ko et al. | |
| 8,451,776 B2* | 5/2013 | Dayal .................. | H04W 16/14 370/328 |
| 8,553,622 B2* | 10/2013 | Yang ...................... | H04B 1/525 370/328 |
| 8,630,230 B2* | 1/2014 | Liu .......................... | H04J 1/12 370/278 |
| 8,805,303 B2* | 8/2014 | Koo ...................... | H04W 16/14 370/310 |
| 8,831,611 B2* | 9/2014 | Koo .................. | H04W 36/0083 370/328 |
| 8,837,524 B2* | 9/2014 | Liu ..................... | H04L 27/2613 370/474 |
| 8,842,602 B2* | 9/2014 | Koo .................. | H04W 72/1215 370/252 |
| 8,897,220 B2* | 11/2014 | Kadous ............. | H04W 72/1215 370/328 |
| 9,049,747 B2 | 6/2015 | Zhao et al. | |
| 9,838,054 B2 | 12/2017 | Zhao et al. | |
| 2008/0176554 A1 | 7/2008 | Gibbons et al. | |
| 2011/0134746 A1* | 6/2011 | Liu .......................... | H04J 1/12 370/201 |
| 2011/0158211 A1 | 6/2011 | Gaal et al. | |
| 2011/0223964 A1 | 9/2011 | Ebiko | |
| 2012/0071103 A1* | 3/2012 | Kadous ............. | H04W 72/1215 455/63.1 |
| 2012/0093009 A1 | 4/2012 | Wang et al. | |
| 2012/0195291 A1* | 8/2012 | Kuo ........................ | H04W 4/06 370/336 |
| 2012/0201152 A1 | 8/2012 | Yoo et al. | |
| 2012/0207040 A1 | 8/2012 | Comsa et al. | |
| 2012/0281563 A1 | 11/2012 | Comsa et al. | |
| 2012/0307749 A1 | 12/2012 | Banister et al. | |
| 2012/0329515 A1* | 12/2012 | Husted ................ | H04W 52/226 455/552.1 |
| 2013/0001663 A1 | 1/2013 | Abbott et al. | |
| 2013/0016635 A1 | 1/2013 | Linsky et al. | |
| 2013/0301420 A1* | 11/2013 | Zhang ................. | H04W 76/048 370/241 |

FOREIGN PATENT DOCUMENTS

| | | |
|---|---|---|
| JP | 2010517375 A | 5/2010 |
| JP | 102835139 A | 12/2012 |
| JP | 2013545327 A | 12/2013 |
| JP | 2014505416 A | 2/2014 |
| KR | 10-2012-0020170 A | 3/2012 |
| TW | I341099 B | 4/2011 |
| TW | I371184 B | 8/2012 |
| WO | 2010061626 A1 | 6/2010 |
| WO | 2010132294 A1 | 11/2010 |
| WO | 2011123555 A1 | 10/2011 |
| WO | 2011126879 A2 | 10/2011 |
| WO | 2012017129 A1 | 2/2012 |
| WO | 2012040497 A1 | 3/2012 |
| WO | 2012047001 A1 | 4/2012 |
| WO | 2012061765 A1 | 5/2012 |
| WO | 2012092851 A1 | 7/2012 |
| WO | 2012093349 A2 | 7/2012 |
| WO | 2012096801 A1 | 7/2012 |
| WO | 2012096949 A1 | 7/2012 |
| WO | 2012134193 A2 | 10/2012 |

OTHER PUBLICATIONS

Taiwanese Patent Application No. 102149117—Office Action dated Apr. 30, 2015.
Korean Patent Application No. 10-2015-7022726—Notice of preliminary Rejection dated Apr. 21, 2016.
European Patent Application No. 13875752.1—Search Report dated Jun. 16, 2016.
Japanese Patent Application No. 2015-559232—Office Action dated Aug. 12, 2016.
Ericsson, "Methods for WLAN/Bluetooth in-device coexistence interference avoidance", 3GPP Draft; R2-103900 Methods for Wlan and Bluetooth In-Device Coexistence Interference Avoidance, 3rd Generation Partnership Project (3 pages), Mobile Competence Centre ; 650, Route Des Lucioles ; F-06921 Sophia-Antipolis Cedex; France, vol. RAN WG2, no. Stockholm, Sweden; Jun. 28, 2010, Jun. 22, 2010 (Jun. 22, 2010), [retrieved on Jun. 22, 2010]m 3 pages.
European Patent Application No. 13875752.1—Communication Pursuant to Article 94(3) EPC dated May 29, 2017.
Chinese Application for Invention No. 201380073674.8—First Office Action dated Nov. 29, 2017.
European Patent Application No. 13875752.1—Office Action dated Jan. 4, 2018.
Japanese Patent Application No. 2017-109290—First Office Action dated Mar. 23, 2018.
Chinese Patent Application No. 201380073674.8—Second Office Action dated Jul. 9, 2018.

\* cited by examiner

FACILITATING IN-DEVICE COEXISTENCE BETWEEN WIRELESS COMMUNICATION TECHNOLOGIES

CROSS-REFERENCE TO RELATED APPLICATIONS

This application is a continuation of U.S. patent application Ser. No. 14/727,682, filed on Jun. 1, 2015, entitled "FACILITATING IN-DEVICE COEXISTENCE BETWEEN WIRELESS COMMUNICATION TECHNOLOGIES," which is a continuation of U.S. patent application Ser. No. 13/909,298, filed on Jun. 4, 2013, entitled "FACILITATING IN-DEVICE COEXISTENCE BETWEEN WIRELESS COMMUNICATION TECHNOLOGIES," which claims the benefit of U.S. Provisional Patent Application No. 61/769,144, filed on Feb. 25, 2013, entitled "FACILITATING IN-DEVICE COEXISTENCE BETWEEN WIRELESS COMMUNICATION TECHNOLOGIES," the contents of which are incorporated by reference herein in their entirety for all purposes.

FIELD OF THE DESCRIBED EMBODIMENTS

The described embodiments relate generally to wireless communications and more particularly to facilitating in-device coexistence between wireless communication technologies.

BACKGROUND

Many wireless communication devices support multiple wireless communication technologies and may concurrently communicate via multiple wireless communication technologies. In many instances, wireless communication technologies used by a device can use channel bands that may interfere with each other. In such instances, energy from a band used by one technology can leak into a band used by another technology. This energy leakage can raise the noise floor and cause a problem known as desense. In many instances, desense can negatively impact the use of certain channel bands and, in severe cases, can render certain channel bands unusable. Accordingly, interference that can result in desense poses a problem for in-device coexistence of multiple wireless communication technologies.

A particularly troublesome in-device coexistence condition can result from a scenario in which a device emits a transmission via a first wireless communication technology, referred to as an aggressor technology, while the device is receiving data via a second wireless communication technology, referred to as a victim technology. Data receipt by the victim technology can be damaged by desense interference from the aggressor transmission. In this regard, received packet errors, or even complete deafening of the victim technology receiver can result from the interference that can be caused by the aggressor technology transmission. For example transmission of a cellular signal by a device at a time when a Bluetooth or wireless local area network (WLAN) signal is received can deafen the Bluetooth or WLAN receiver, causing errors and, in some cases, complete loss of connection.

SUMMARY OF THE DESCRIBED EMBODIMENTS

This document describes, inter alia, techniques for facilitating in-device coexistence between wireless communication technologies on a wireless communication device. According to some embodiments, a wireless communication device may operate using two or more wireless communication technologies, which may include an "aggressor" technology and a "victim" technology. The wireless communication device may detect an in-device interference condition, indicating that the transmission of data via the aggressor technology interfere with the reception of data at the victim technology; upon detecting this condition, the wireless communication device may reduce the bit rate of the data traffic transmitted on the aggressor technology.

This Summary is provided merely for purposes of summarizing some example embodiments so as to provide a basic understanding of some aspects of this disclosure. Accordingly, it will be appreciated that the above described example embodiments are merely examples and should not be construed to narrow the scope or spirit of the features described herein in any way. Other embodiments, aspects, and advantages of the subject matter described herein will become apparent from the following Detailed Description, Figures, and Claims.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Some example embodiments described in this document address an in-device coexistence problem between wireless communication technologies. More particularly, some example embodiments described further herein address a situation in which a transmission is emitted by a device via an aggressor technology while the device is to receive data via a victim technology. In such situations, the aggressor technology transmissions can inhibit data reception via the victim technology, potentially resulting in received data errors, or in extreme cases, even completely deafening the victim technology receiver. For example, when a device communicates concurrently via cellular communications and a lower powered communication technology utilizing an industrial, scientific, and medical (ISM) band, such as an Institute of Electrical and Electronics Engineers (IEEE) 802.15 wireless personal area network (PAN) communication technology (e.g., Bluetooth and/or other wireless PAN communication technology) or WLAN technology, cellular transmissions can prevent data reception via the ISM band technology. Some example embodiments facilitate in-device coexistence between wireless communication technologies by mitigating such in-device interference conditions. More particularly, in accordance with some embodiments, a bit rate of data traffic transmitted via the aggressor wireless communication technology can be reduced in response to occurrence of an in-device interference condition. This reduction, or "throttling," of the bit rate of data traffic transmitted via the aggressor wireless communication technology can mitigate in-device interference with concurrent data reception via the victim wireless communication technology. In this regard, for example, in some embodiments, reducing the bit rate of data traffic transmitted via the aggressor wireless communication technology can allow for improved concurrent data reception via the victim wireless communication technology by yielding a resulting reduction in transmission power of transmissions via the aggressor wireless communication technology and/or by creating time gaps in data traffic transmission via the aggressor wireless communication technology.

Figure 1:
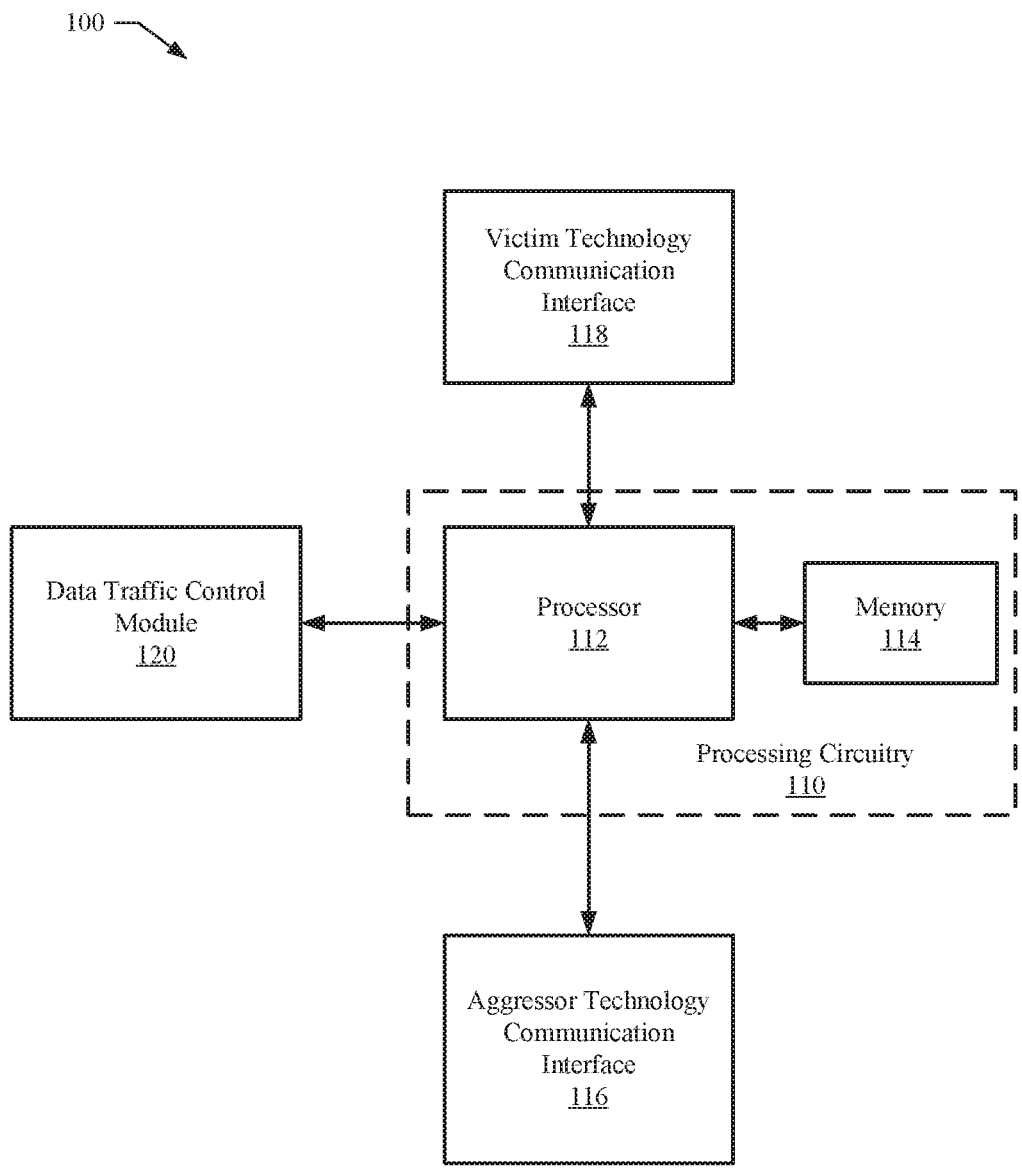
FIG. 1 illustrates a block diagram of a wireless communication device in accordance with some example embodiments.

Referring now to FIG. 1, FIG. 1 illustrates a block diagram of a wireless communication device 100 in accordance with some example embodiments. The wireless communication device 100 can be any device capable of communicating via multiple wireless communication technologies. By way of non-limiting example, the wireless communication device 100 can be a mobile phone, tablet computing device, laptop computer, or other computing device adapted to communicate via multiple wireless communication technologies. It will be appreciated that the components, devices or elements illustrated in and described with respect to FIG. 1 below may not be mandatory and thus some may be omitted in certain embodiments. Additionally, some embodiments can include further or different components, devices or elements beyond those illustrated in and described with respect to FIG. 1.

In some example embodiments, the wireless communication device 100 can include processing circuitry 110 that is configurable to perform actions in accordance with one or more example embodiments disclosed herein. In this regard, the processing circuitry 110 can be configured to perform and/or control performance of one or more functionalities of the wireless communication device 100 in accordance with various example embodiments, and thus can provide means for performing functionalities of the wireless communication device 100 in accordance with various example embodiments. The processing circuitry 110 can be configured to perform data processing, application execution and/or other processing and management services according to one or more example embodiments.

In some embodiments, the wireless communication device 100 or a portion(s) or component(s) thereof, such as the processing circuitry 110, can include one or more chipsets, which can each include one or more chipsets. The processing circuitry 110 and/or one or more further components of the wireless communication device 100 can therefore, in some instances, be configured to implement an embodiment on a chipset. In some example embodiments in which one or more components of the wireless communication device 100 is embodied as a chipset(s), the chipset(s) can enable the wireless communication device 100 to operate within one or more wireless networks in accordance with one or more wireless communication technologies.

In some example embodiments, the processing circuitry 110 can include a processor 112 and, in some embodiments, such as that illustrated in FIG. 1, can further include memory 114. The processing circuitry 110 can be in communication with or otherwise control an aggressor technology communication interface 116, victim technology communication interface 118, and/or data traffic control module 120.

The processor 112 can be embodied in a variety of forms. For example, the processor 112 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 112 can comprise a plurality of processors. The plurality of processors can be in operative communication with each other and can be collectively configured to perform one or more functionalities of the wireless communication device 100 as described herein. In some example embodiments, the processor 112 can be configured to execute instructions that can be stored in the memory 114 or that can be otherwise accessible to the processor 112. As such, whether configured by hardware or by a combination of hardware and software, the processor 112 capable of performing operations according to various embodiments while configured accordingly.

In some example embodiments, the memory 114 can include one or more memory devices. Memory 114 can include fixed and/or removable memory devices. In some embodiments, the memory 114 can provide a non-transitory computer-readable storage medium that can store computer program instructions that can be executed by the processor 112. In this regard, the memory 114 can be configured to store information, data, applications, instructions and/or the like for enabling the wireless communication device 100 to carry out various functions in accordance with one or more example embodiments. In some embodiments, the memory 114 can be in communication with one or more of the processor 112, aggressor technology communication interface 116, victim technology communication interface 118, or data traffic control module 120 via a bus(es) for passing information among components of the wireless communication device 100.

The wireless communication device 100 can further include an aggressor technology communication interface 116. The aggressor technology communication interface 116 can be configured to enable the wireless communication device 100 to establish and support a wireless connection to another device and/or another device in accordance with an aggressor wireless communication technology. As such, the aggressor technology communication interface 116 can include, for example, an antenna (or multiple antennas) and supporting hardware and/or software for enabling communications in accordance with an aggressor wireless communication technology that can be supported by the aggressor technology communication interface 116. In some example embodiments, the aggressor technology communication interface 116 can include, or be implemented as a chipset, which, when implemented on a device such as the wireless communication device 100, can enable the device to transmit and/or receive data via the aggressor wireless communication technology.

The aggressor technology communication interface 116 can support any wireless communication technology, which can act as an aggressor to another wireless communication technology (e.g., a victim wireless communication technology). In some example embodiments, the aggressor technology communication interface 116 can be a cellular communication interface. For example, the aggressor technology communication interface 116 can be configured to support communication via a Long Term Evolution (LTE) cellular communication technology, an LTE-Advanced (LTE-A) cellular communication technology, a Universal Mobile Telecommunications System (UMTS) cellular communication technology, a Global System for Mobile Communications (GSM) cellular communication technology, a Code Division Multiple Access (CDMA) cellular communication technology, or a CDMA 2000 cellular communication technology, and/or other cellular communication technology.

The wireless communication device 100 can further include a victim technology communication interface 118. The victim technology communication interface 118 can be configured to enable the wireless communication device 100 to establish and support a wireless connection to another device and/or another device in accordance with a victim wireless communication technology. As such, the victim technology communication interface 118 can include, for example, an antenna (or multiple antennas) and supporting hardware and/or software for enabling communications in accordance with a victim wireless communication technology that can be supported by the victim technology communication interface 118. In some example embodiments, the victim technology communication interface 118 can include, or be implemented as a chipset, which, when implemented on a device such as the wireless communication device 100, can enable the device to transmit and/or receive data via the victim wireless communication technology.

The victim technology communication interface 118 can support any wireless communication technology, which can suffer as a victim to another wireless communication technology (e.g., an aggressor wireless communication technology). In some example embodiments, the victim technology communication interface 118 can be a wireless local area network (WLAN) and/or wireless personal area network (WPAN) communication interface. For example in some example embodiments in which the victim technology communication interface 118 provides a WPAN communication interface, the victim technology communication interface 118 can support communication via Bluetooth or other IEEE 802.15-based WPAN technology, Zigbee, and/or other WPAN technology. As a further example, in some example embodiments in which the victim technology communication interface 118 provides a WLAN communication interface, the victim technology communication interface 118 can support communication via Wi-Fi (e.g., based on one or more of: IEEE 802.11a; IEEE 802.11b; IEEE 802.11g; IEEE 802.11-2007; IEEE 802.11n; IEEE 802.11-2012; IEEE 802.11ac; or other IEEE 802.11 technologies) and/or other WLAN communication technology. Such WLAN and WPAN technologies often use frequency bands within an ISM band. However, it will be appreciated that various WLAN and WPAN technologies can use non-ISM bands as well, and the usage of such bands is contemplated within the scope of the disclosure. For example, IEEE 802.11-2012 supports the usage of the 3.65-3.7 GHz frequency band. Frequently, the frequency bands used by various WLAN and WPAN technologies are unlicensed frequency bands, but in some cases a WLAN and/or WPAN technology that can be supported by the victim technology communication interface 118 can utilize one or more frequency bands that may be licensed by a body that may regulate portions of the frequency spectrum within a political/geographic region, such as, by way of non-limiting example, the Federal Communications Commission (FCC) in the United States. It will be appreciated, however, that embodiments are not limited to facilitating cellular and WLAN/WPAN (e.g., ISM band) coexistence, as some embodiments can facilitate in-device coexistence between any two disparate wireless communication technologies. For example, in some embodiments, the aggressor technology communication interface 116 can support a first cellular communication technology and the victim technology communication interface 118 can support a second cellular communication technology. As a further alternative example, in some embodiments, the aggressor technology communication interface 116 can support a first WLAN/WPAN communication technology, such as may use an ISM band, and the victim technology communication interface 118 can support a WLAN/WPAN communication technology, such as may use an ISM band.

It will be appreciated, however, that while examples are given herein with the aggressor technology being a cellular technology and the victim technology being a WLAN/WPAN technology, other coexistence scenarios can be facilitated in accordance with various example embodiments. In this regard, the aggressor technology communication interface 116 can support a wireless communication technology other than a cellular technology, which can act as an aggressor to another wireless communication technology. Similarly, the victim technology communication interface 118 can support a wireless communication technology other than a WLAN/WPAN technology that can suffer as a victim to another wireless communication technology. Indeed, in some instances, a WLAN/WPAN technology can even serve as an aggressor to a cellular technology, and some embodiments can be applied to reduce a bit rate of data traffic that can be transmitted via the WLAN/WPAN technology to support coexistence in such instances. As still a further example, some example embodiments can support coexistence between two or more WLAN/WPAN technologies.

The wireless communication device 100 can further include data traffic control module 120. The data traffic control module 120 can be embodied as various means, such as circuitry, hardware, a computer program product including a computer readable medium (for example, the memory 114) storing computer readable program instructions that are executable by a processing device (for example, the processor 112), or some combination thereof. In some embodiments, the processor 112 (or the processing circuitry 110) can include, or otherwise control the data traffic control module 120. As will be described further herein below, the data traffic control module 120 can be configured in some example embodiments to determine an occurrence of an in-device interference condition resulting from transmission of data traffic via the aggressor technology communication interface 116 interfering with concurrent data reception via the victim technology communication interface 118 and to reduce a bit rate of the data traffic transmitted via the aggressor technology communication interface 116 in response to the in-device interference condition.

Figure 2:
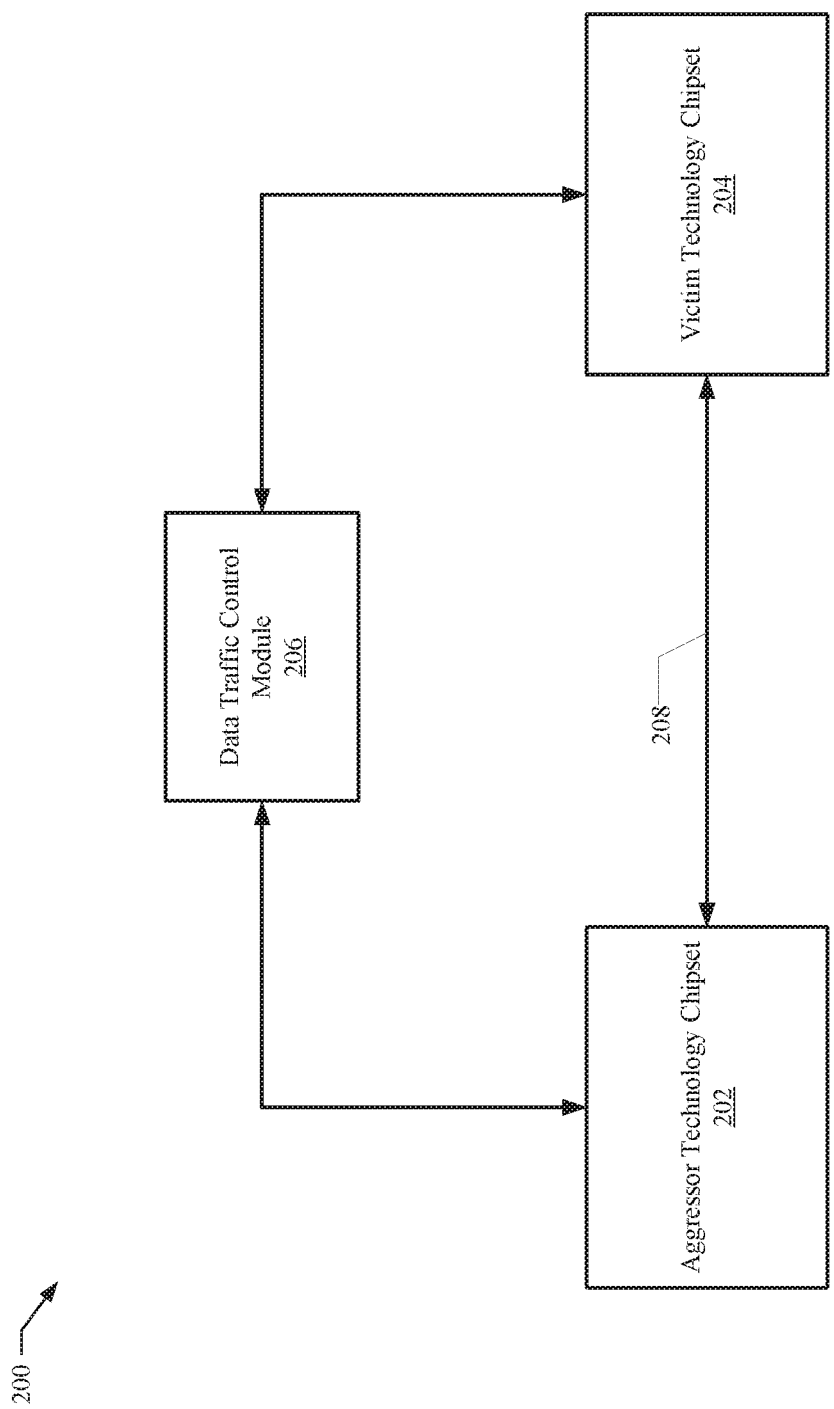
FIG. 2 illustrates an example chipset architecture for facilitating in-device coexistence between wireless communication technologies in accordance with some example embodiments.

As discussed, in some example embodiments, the components illustrated in FIG. 1 can form one or more chipsets. FIG. 2 illustrates an example chipset architecture 200 for facilitating in-device coexistence between wireless communication technologies in accordance with some example embodiments. The chipset architecture 200 can include an aggressor technology chipset 202 and victim technology chipset 204, each of which can be interfaced with a data traffic control module 206. The aggressor technology chipset 202 can be an embodiment of the aggressor technology communication interface 116 in which the aggressor technology communication interface 116 is at least partially implemented as a chipset. The victim technology chipset 204 can, likewise, be an embodiment of the victim technology communication interface 118 in which the victim technology communication interface 118 is at least partially implemented as a chipset. The data traffic control module 206 can be an embodiment of the data traffic control module 120. In some example embodiments, the processing circuitry 110 can be configured to facilitate interfacing between the data traffic control module 206 and each of the aggressor technology chipset 202 and victim technology chipset 204. The interface between the data traffic control module 206 and the victim technology chipset 204 can enable communication between the victim technology chipset 204 and data traffic control module 206 so that the data traffic control module 206 can determine an occurrence of an in-device interference condition based at least in part on measurements and/or other feedback that can be provided by the victim technology chipset 204. The interface between the data traffic control module 206 and the aggressor technology chipset 202 can enable the data traffic control module 206 to reduce a bit rate of data traffic that can be provided to the aggressor technology chipset 202 for transmission in response to occurrence of an in-device interference condition.

In some example embodiments, the aggressor technology chipset 202 and victim technology chipset 204 can be interfaced via an interface 208. The interface 208 can, for example, be implemented via a bus(es) that can enable communication between the aggressor technology chipset 202 and victim technology chipset 204. In some embodiments including an interface 208, the interface 208 can be a direct interface between the aggressor technology chipset 202 and victim technology chipset 204. Alternatively, in some embodiments including an interface 208, the interface 208 can be an indirect interface, which can traverse one or more further components of the wireless communication device 100, such as, the processing circuitry 110, processor 112, memory 114, and/or other component of the wireless communication device 100. The interface 208 can, for example, enable the aggressor technology chipset 202 to inform the victim technology chipset 204 when data traffic is transmitted via the aggressor wireless communication technology so that the victim technology chipset 204 can discriminate in-device interference conditions from interference that can be caused from external factors.

It will be appreciated that embodiments other than those in which separate chipsets are used for the aggressor technology and the victim technology are contemplated within the scope of the disclosure. For example, in some example embodiments, both the aggressor technology and the victim technology can be supported by a common chipset. In such embodiments, both the aggressor technology communication interface 116 and victim technology communication interface 118 can be co-located on a single chipset. Thus, for example, some example embodiments can be implemented on a single chip or chipset configured to provide both cellular and a WLAN and/or WPAN communication functionality, such as Bluetooth, WLAN, some combination thereof, and/or the like.

Figure 3:
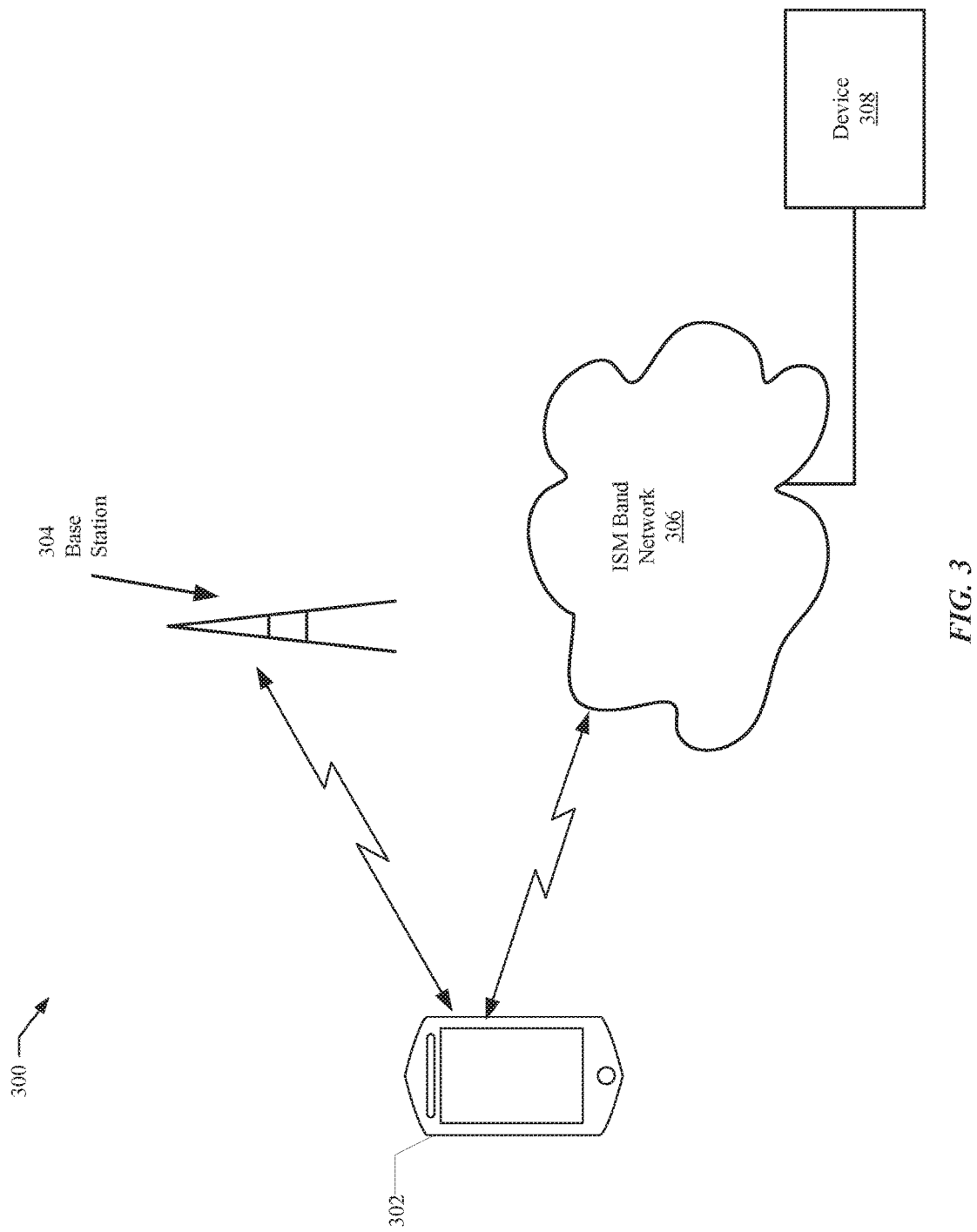
FIG. 3 illustrates an example system in which some example embodiments can be implemented to facilitate in-device coexistence between wireless communication technologies.

FIG. 3 illustrates an example system 300 in which some example embodiments can be implemented to facilitate in-device coexistence between wireless communication technologies. The system 300 can include a wireless communication device 302, which can, for example, be an embodiment of wireless communication device 100. In some example embodiments, the wireless communication device 302 can include aggressor technology chipset 202 and victim technology chipset 204. The wireless communication device 302 can be configured to engage in cellular communications, which can be supported by a base station 304. For example, the wireless communication device 302 can be configured to engage in communication via a Long Term Evolution (LTE) cellular communication technology, a Universal Mobile Telecommunications System (UMTS) cellular communication technology, a Global System for Mobile Communications (GSM) cellular communication technology, a Code Division Multiple Access (CDMA) cellular communication technology, a CDMA 2000 cellular communication technology, and/or other cellular communication technology. The wireless communication device 302 can be further configured to engage in communications via an ISM band technology. Thus, for example, the wireless communication device 302 can engage in wireless communications with a device 308 via an ISM band network 306. For example, in embodiments in which the ISM band network 306 is a Bluetooth network, the device 308 can be a Bluetooth headset or other Bluetooth device that can be interfaced with a wireless communication device. As another example, in embodiments in which the ISM band network 306 is a WLAN, the device 308 can be a WLAN access point, a second WLAN station, and/or other device with which a wireless communication device can communicate over a WLAN. It will be appreciated, however, that a network implementing a WLAN or WPAN technology using a non-ISM band can be substituted for the ISM band network 306 within the scope of the disclosure.

In context of the system 300, various embodiments, including at least some of those described further herein below can be implemented on the wireless communication device 302 to reduce the bit rate of cellular data traffic that can be transmitted by the wireless communication device 302 to the base station 304 in response to situations in which transmission of the cellular data traffic interferes with concurrent reception by the wireless communication device 302 of data sent by the device 308 via the ISM band network 306. Additionally or alternatively, in some embodiments, the bit rate of ISM band data traffic that can be transmitted by the wireless communication device 302 to the device 308 over the ISM band network 306 can be reduced in response to situations in which transmission of the ISM band data traffic interferes with concurrent reception by the wireless communication device 302 of cellular data sent by the base station 304. It will be appreciated, however, that system 300 is provided merely by way of example. In this regard, as previously noted, some example embodiments facilitate in-device wireless communication technology coexistence scenarios other than cellular and ISM band coexistence.

Having now described example devices and components that can implement various embodiments disclosed herein and an example system in which some example embodiments can be implemented, several example embodiments will be described in additional detail with reference to the components described in FIGS. 1 and 2. Further, some example embodiments will be described by way of example with respect to the system 300 illustrated in FIG. 3.

In some example embodiments, the data traffic control module 120 can be configured to determine occurrence of an in-device interference condition resulting from transmission of data traffic via the aggressor wireless communication technology interfering with concurrent data reception by the wireless communication device 100 via the victim wireless communication technology. For example, the data traffic control module 120 can be configured to determine that an in-device interference condition exists any time in which transmission of data traffic via the aggressor technology communication interface 116 is ongoing concurrent with data reception via the victim technology communication interface 118.

Additionally or alternatively, the data traffic control module 120 can be configured to determine an occurrence of an in-device interference condition based at least in part on measurements and/or other feedback that can be provided by the victim technology communication interface 118. For example, in some embodiments, such as, by way of non-limiting example, embodiments in which the victim wireless communication technology is Bluetooth, the victim technology communication interface 118 can be configured to calculate an observed received data error rate and report an indication of the observed data error rate to the data traffic control module 120. If the observed received data error rate exceeds a threshold error rate, then it can be determined that there is an in-device interference condition for which a bit rate of data traffic transmitted via the aggressor technology communication interface 116 should be reduced. Additionally or alternatively, in some example embodiments, such as by way of non-limiting example, embodiments in which the victim wireless communication technology is WLAN, the victim technology communication interface 118 can be configured to measure an observed noise floor and report an indication of the observed noise floor to the data traffic control module 120. If the observed noise floor exceeds a threshold, then it can be determined that there is an in-device interference condition for which a bit rate of data traffic transmitted via the aggressor technology communication interface 116 should be reduced.

In some example embodiments, the data traffic control module 120 and/or victim technology communication interface 118 can be configured to discriminate between an in-device interference condition and situations in which data reception via the victim wireless communication technology suffers from interference that can be caused by factors external to the wireless communication device 100. For example, in some embodiments, the data traffic control module 120 and/or victim technology communication interface 118 can know when data traffic is transmitted via the aggressor technology communication interface 116, and can determine that interference suffered by the victim technology communication interface 118 results from an in-device interference condition only in an instance in which there is concurrent data traffic transmission via the aggressor technology communication interface 116. In some such embodiments, the aggressor technology communication interface 116 can inform the victim technology communication interface 118 when data traffic is being transmitted via the aggressor technology communication interface 116 so that the victim technology communication interface 118 can identify instances in which an in-device interference condition may exist. For example, in embodiments, such as that illustrated in FIG. 2, the aggressor technology chipset 202 can provide a signal to the victim technology chipset 204 via the interface 208 to indicate when data traffic is being transmitted by the aggressor technology chipset 202.

In some example embodiments, the data traffic control module 120 and/or victim technology communication interface 118 can be configured to discriminate between an in-device interference condition and situations in which data reception via the victim wireless communication technology suffers from external interference based at least in part on a comparison between baseline measurements that can be captured by the victim technology communication interface 118 when data traffic is not being transmitted via the aggressor technology communication interface 116 and measurements that can be captured by the victim technology communication interface 118 when data traffic is being transmitted via the aggressor technology communication interface 116. For example, a baseline noise floor measurement can be compared to a noise floor measurement captured while data traffic is being transmitted via the aggressor technology communication interface 116 to determine a contribution of transmission via the aggressor wireless communication technology to the noise floor. If the difference between the noise floor during transmission of data traffic via the aggressor wireless communication technology and the baseline noise floor exceeds a threshold, then it can be determined that there is an in-device interference condition for which a bit rate of data traffic transmitted via the aggressor technology communication interface 116 should be reduced.

As another example, a baseline throughput for data reception via the victim technology communication interface 118 that can be observed when data traffic is not transmitted via the aggressor wireless communication technology can be compared to a throughput measured for data reception during transmission of data traffic via the aggressor wireless communication technology. If a reduction in throughput exceeding a threshold occurs as a result of in-device interference from transmission of data traffic via the aggressor wireless communication technology, then it can be determined that there is an in-device interference condition for which a bit rate of data traffic transmitted via the aggressor technology communication interface 116 should be reduced. Similarly, in some example embodiments, a baseline received data error rate that can be observed by the victim technology communication interface 118 while data traffic is not being transmitted via the aggressor technology communication interface 116 can be compared to a received data error rate that can be observed by the victim technology communication interface 118 while data traffic is being transmitted via the aggressor technology communication interface 116. If there is an increase in observed received data error rate from the baseline received data error rate that exceeds a threshold, then it can be determined that there is an in-device interference condition for which a bit rate of data traffic transmitted via the aggressor technology communication interface 116 should be reduced.

In some example embodiments, the data traffic control module 120 can be configured to reduce a bit rate of data traffic transmitted via the aggressor wireless communication technology in response to an in-device interference condition. In this regard, the data traffic control module 120 can be configured to reduce a bit rate of data provided to the aggressor technology communication interface 116 for transmission. In some example embodiments, reducing the bit rate of data provided to the aggressor technology communication interface 116 can include reducing a bit rate of data provided to a protocol stack for transmission via the aggressor technology communication interface 116. In this regard, data slated for transmission via the aggressor wireless communication technology can be temporarily queued in a protocol stack before being transmitted via the aggressor technology communication interface 116. The protocol stack can be any type of protocol stack that can be used for network communication. By way of non-limiting example, the protocol stack can be a Transmission Control Protocol/Internet protocol (TCP/IP) stack, Real-time Transport Protocol/User Datagram Protocol (RTP/UDP) stack, or other type of protocol stack that can be used to support network communication of data traffic. The type of protocol stack used can vary based on factors, such as a type of data traffic being transmitted. For example, an RTP/UDP stack can be used for real-time communications, such as video conferencing. In some instances, such as when multiple types of data traffic are being transmitted, multiple types of protocol stacks can be used concurrently. In such instances, the bit rate of data provided to one or more protocol stacks can be reduced.

Figure 4:
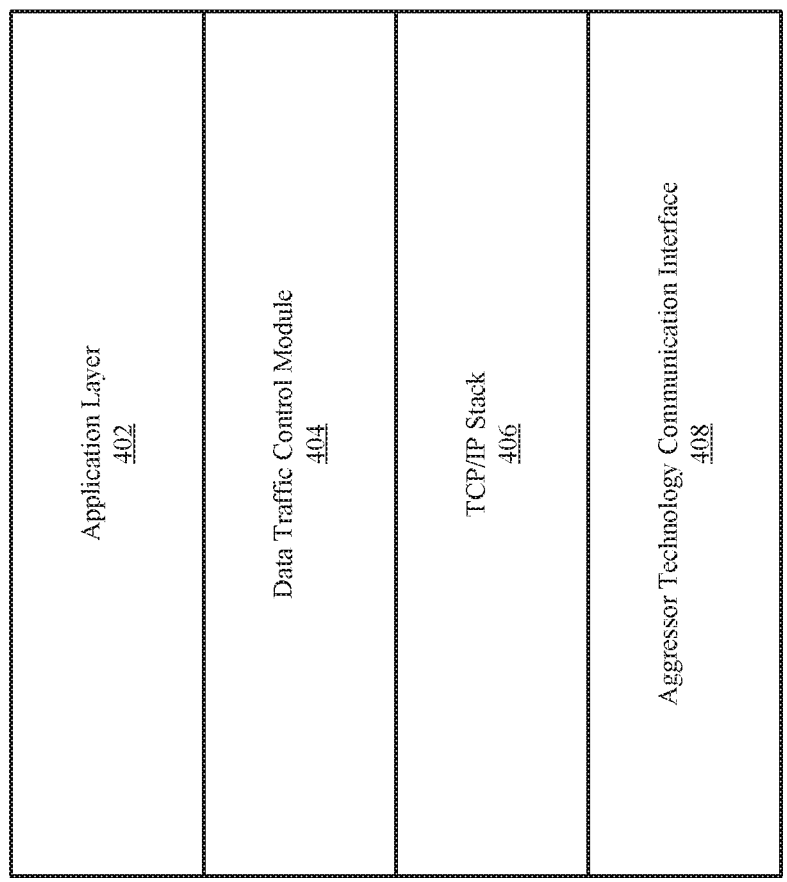
FIG. 4 illustrates a system layer diagram in accordance with some example embodiments.

FIG. 4 illustrates a system layer diagram including a TCP/IP stack 406 in accordance with some example embodiments. It will be appreciated, however, that other types of protocol stacks can be implemented in addition to or in lieu of the TCP/IP stack 406 within the context of the system layer diagram of FIG. 4. As illustrated in FIG. 4, the TCP/IP stack 406 can be positioned at a layer higher than the aggressor technology communication interface 408, which can be an embodiment of the aggressor technology communication interface 116. A data traffic control module 404, which can be an embodiment of the data traffic control module 120, can be implemented at a higher layer than the TCP/IP stack 406. In this regard, the data traffic control module 404 can be positioned to interface between an application layer 402 and the TCP/IP stack 406. The application layer 402 can generate data for transmission via the aggressor wireless communication technology. The data generated by the application layer 402 can be forwarded to the TCP/IP stack 406, where the data can be temporarily queued before being provided to the aggressor technology communication interface 408 for transmission. In the event of an in-device interference condition, the data traffic control module 404 can reduce a bit rate of data provided by the application layer 402 to the TCP/IP stack 406 for transmission via the aggressor technology communication interface 408. For example, in some embodiments, the data traffic control module 404 can instruct the application layer 402 to reduce a bit rate of data generated for transmission via the aggressor wireless communication technology. Additionally or alternatively, the data traffic control module 404 can encode or otherwise modify data generated by the application layer 402 prior to providing the data to the TCP/IP stack 406 so that a bit rate of data traffic transmitted via the aggressor technology communication interface 408 is reduced in response to an in-device interference condition.

In embodiments in which the aggressor wireless communication technology is a cellular technology, such as in the embodiment illustrated in FIG. 3, reducing the bit rate of cellular data traffic can further serve to influence a grant that can be provided to the wireless communication device 100 by the serving cellular network (e.g., a grant that can be provided by the base station 304). In this regard, if the wireless communication device 100 reduces a bit rate of cellular data traffic, then the wireless communication device 100 can effectively transmit less data over the cellular uplink. The serving cellular network can in turn reduce a grant that can be given to the wireless communication device 100, which can reduce an uplink transmission power that can be used by the wireless communication device 100. As a result, data reception via the victim wireless communication technology can benefit from the resulting reduced aggressor wireless communication technology transmission power in addition to time gaps in aggressor data traffic transmissions that can result from a reduced bit rate. Additionally or alternatively, in some cellular systems, such as LTE or LTE-A cellular systems, reducing the bitt rate of cellular data traffic can result in a reduction in allocated bandwidth. In this regard, fewer resource blocks may be allocated by the serving cellular network (e.g., by the base station 304), which can reduce desense of the victim wireless communication technology.

Figure 5:
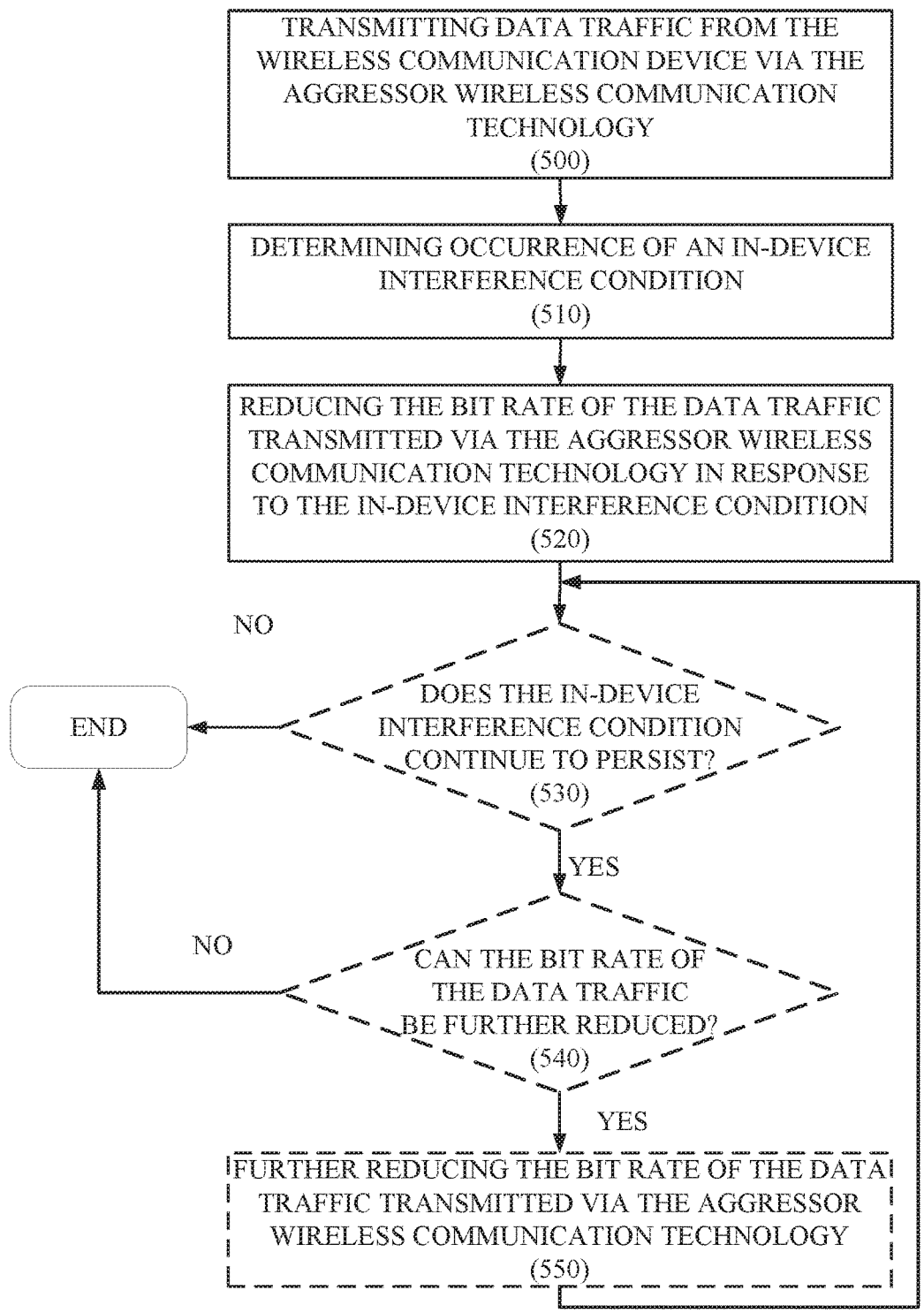
FIG. 5 illustrates a flowchart according to an example method for facilitating in-device coexistence between wireless communication technologies according to some example embodiments.

FIG. 5 illustrates a flowchart according to an example method for facilitating in-device coexistence between wireless communication technologies according to some example embodiments. Operation 500 can include transmitting data traffic from the wireless communication device 100 via the aggressor wireless communication technology. In this regard, data traffic can be transmitted via the aggressor technology communication interface 116. Operation 510 can include the data traffic control module 120 determining an occurrence of an in-device interference condition. This determination can, for example, be made based at least in part on a measurement and/or other indication that can be reported by the victim technology communication interface 118. Operation 520 can include the data traffic control module 120 reducing the bit rate of the data traffic transmitted via the aggressor wireless communication technology in response to the in-device interference condition.

In some example embodiments, the method can conclude following performance of operation 520. However, in some example embodiments reduction in bit rate of aggressor data traffic can be performed incrementally. In this regard, following a first reduction in bit rate, it can be determined whether the in-device interference condition continues to persist and, if so, the bit rate can be further reduced. For example, the bit rate can initially be scaled back by a first percentage (e.g., 10%), and, if the in-device interference condition continues to persist, can be scaled back by a further percentage (e.g., an additional 10%). In such embodiments, the method can accordingly proceed to operation 530, which can include the data traffic control module 120 determining whether the in-device interference condition continues to persist. If the in-device interference condition does not continue to persist following the reduction in bit rate of operation 520, then the method can terminate. If, however, the in-device interference condition does continue to persist, then the method can proceed to operation 540, which can include determining whether the bit rate of the data traffic can be further reduced. In this regard, there can be constraints in some instances on an amount by which the bit rate can be reduced. For example, there can be a minimum floor level of bit rate due to a type of data traffic being transmitted, constraints of the aggressor wireless communication technology, and/or other factors. As one particular example, in some embodiments, the data traffic can include real time data traffic or other data traffic that can be transmitted with a guaranteed quality of service (QoS). In such instances, the guaranteed QoS can impose a constraint on an amount by which the bit rate of the data traffic can be reduced. If the bit rate of the data traffic cannot be further reduced, then the method can terminate. If, however, the bit rate of the data traffic can be further reduced, then the method can proceed to operation 550, which can include the data traffic control module 120 further reducing the bit rate of the data traffic transmitted via the aggressor wireless communication technology. In some embodiments, operation 540 can be omitted, and the method can proceed to operation 550 following operation 530 without determining whether the bit rate can be further reduced.

Following performance of operation 550, the method can optionally return to operation 530. In this regard, in some embodiments, the bit rate of the data traffic can be incrementally reduced until either the in-device interference condition no longer exists, or until the bit rate of the data traffic cannot be reduced any further.

In some example embodiments, data traffic that can be transmitted via the aggressor wireless communication technology can be grouped into a plurality of traffic classifications, each of which can have a respective priority. For example, data traffic that can be transmitted via the aggressor wireless communication technology can include real time data traffic and non-real time data traffic. The real time data traffic can be accorded a higher priority than the non-real time data traffic, as the real time data traffic may have to be transmitted with a guaranteed QoS. Non-real time data traffic and/or real time data traffic can be further grouped into sub-classifications, based on priority. For example, there can be high priority real time data traffic and low priority real time data traffic. In such example embodiments, the bit rate of a traffic classification having a lowest priority can be reduced first in response to an in-device interference condition. If the in-device interference condition continues to persist, then the bit rate of a traffic classification having a next lowest priority can be reduced, and so on. Thus, for example, operation 520 as described above can be performed for each of one or more traffic classifications based on respective priorities of the traffic classifications in accordance with some example embodiments.

In some such example embodiments, each data traffic classification can be queued for transmission at a protocol stack and/or at the aggressor technology communication interface 116 in a separate traffic queue. As such, reduction of bit rate of a traffic classification can include reducing a bit rate of data added to the traffic queue for that traffic classification.

Figure 6:
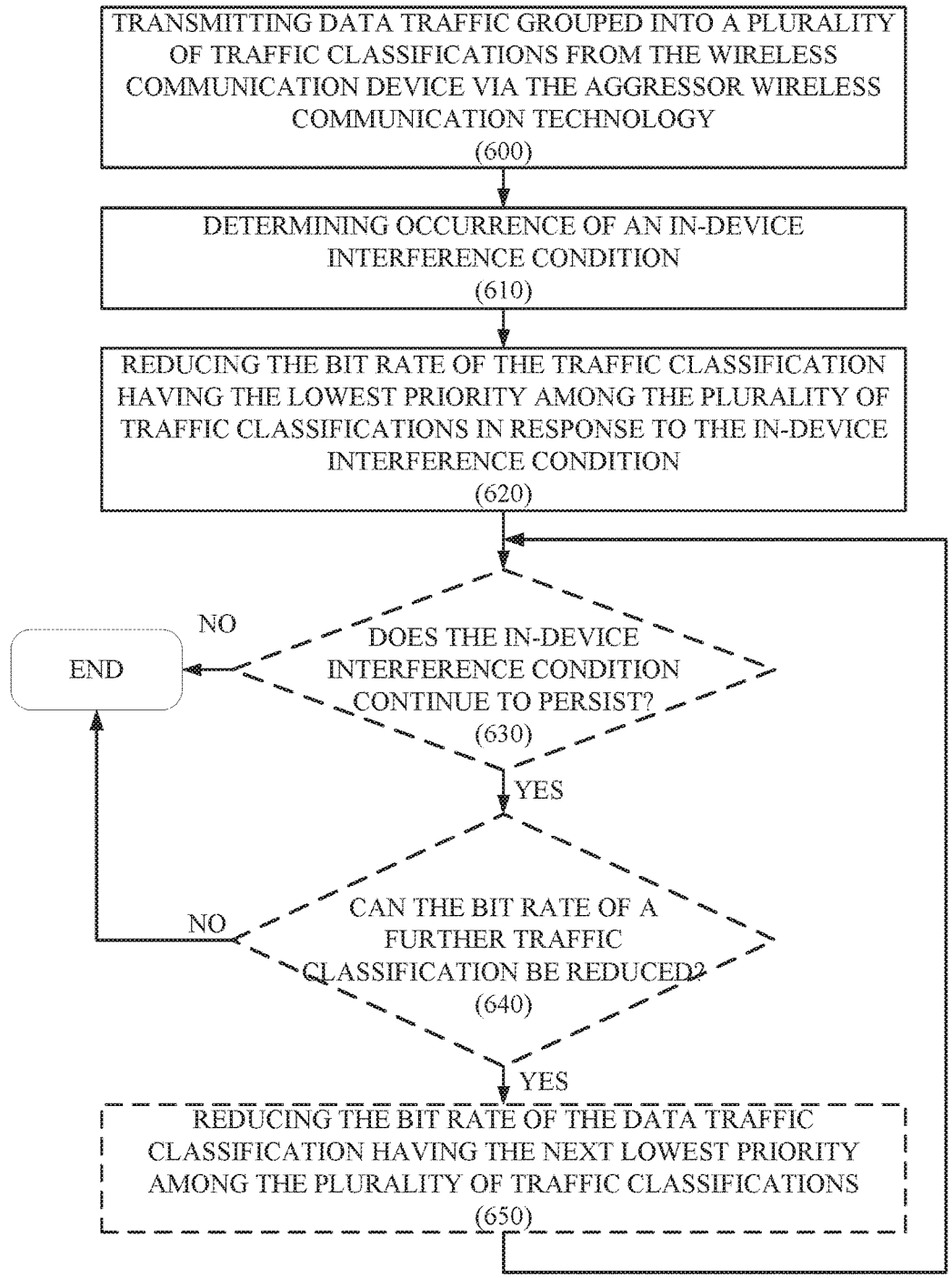
FIG. 6 illustrates a flowchart according to another example method for facilitating in-device coexistence between wireless communication technologies according to some example embodiments.

FIG. 6 illustrates a flowchart according to an example method for facilitating in-device coexistence between wireless communication technologies according to some example embodiments in which data traffic is grouped into a plurality of traffic classifications, each of having a respective priority. Operation 600 can include transmitting data traffic grouped into a plurality of traffic classifications from the wireless communication device 100 via the aggressor wireless communication technology. In this regard, operation 600 can correspond to an embodiment of operation 500 in which transmitted data traffic can be grouped into a plurality of traffic classifications, which can have respective priorities. The data traffic can be transmitted via the aggressor technology communication interface 116. Operation 610 can include the data traffic control module 120 determining an occurrence of an in-device interference condition. This determination can, for example, be made based at least in part on a measurement and/or other indication that can be reported by the victim technology communication interface 118. Operation 620 can include the data traffic control module 120 reducing the bit rate of the traffic classification having the lowest priority among the traffic classifications in response to the in-device interference condition. In this regard, operation 620 can correspond to an embodiment of operation 520 in which a bit rate can be reduced for a specific traffic classification based on a priority of the traffic classification.

In some example embodiments, the method can conclude following performance of operation 620. However, in some example embodiments reduction in bit rate of aggressor data traffic can be performed incrementally. In this regard, following a reduction in bit rate of a lowest priority traffic classification, it can be determined whether the in-device interference condition continues to persist and, if so, the bit rate of a further data traffic classification(s) can be reduced. In such embodiments, the method can accordingly proceed to operation 630, which can include the data traffic control module 120 determining whether the in-device interference condition continues to persist. If the in-device interference condition does not continue to persist following the reduction in bit rate of operation 620, then the method can terminate. If, however, the in-device interference condition does continue to persist, then the method can proceed to operation 640, which can include determining whether the bit rate of a further traffic classification can be reduced. For example, there may be one or more traffic classifications for which a bit rate cannot be reduced due to QoS guarantees for the traffic classification. Accordingly, the data traffic control module 120 can determine whether the bit rate has already been reduced for every traffic classification for which the bit rate can be reduced.

If the bit rate of a further traffic classification cannot be reduced, then the method can terminate. If, however, the bit rate of a further traffic classification can be reduced, then the method can proceed to operation 650, which can include the data traffic control module 120 reducing the bit rate of a traffic classification having a next lowest priority. In this regard, the bit rate of the traffic classification having the lowest priority amongst those traffic classifications for which the bit rate has not previously been reduced can be reduced.

Following performance of operation 650, the method can optionally return to operation 630. In this regard, in some embodiments, the bit rate of the data traffic can be incrementally reduced one traffic classification at a time until either the in-device interference condition no longer exists, or until there are not any further traffic classifications for which the bit rate can be reduced.

It will be appreciated that reduction in bit rate of data traffic transmitted via the aggressor wireless communication technology can be accomplished by any of a variety of methodologies that can be used to reduce a bit rate of data. In some example embodiments, a codec that can be used to encode at least a portion of the data traffic transmitted via the aggressor wireless communication technology can be switched. In this regard, a codec using a lower bit rate can be used in place of a previously used codec such that a bit rate of encoded data generated for transmission via the aggressor wireless communication technology can be reduced.

Figure 7:
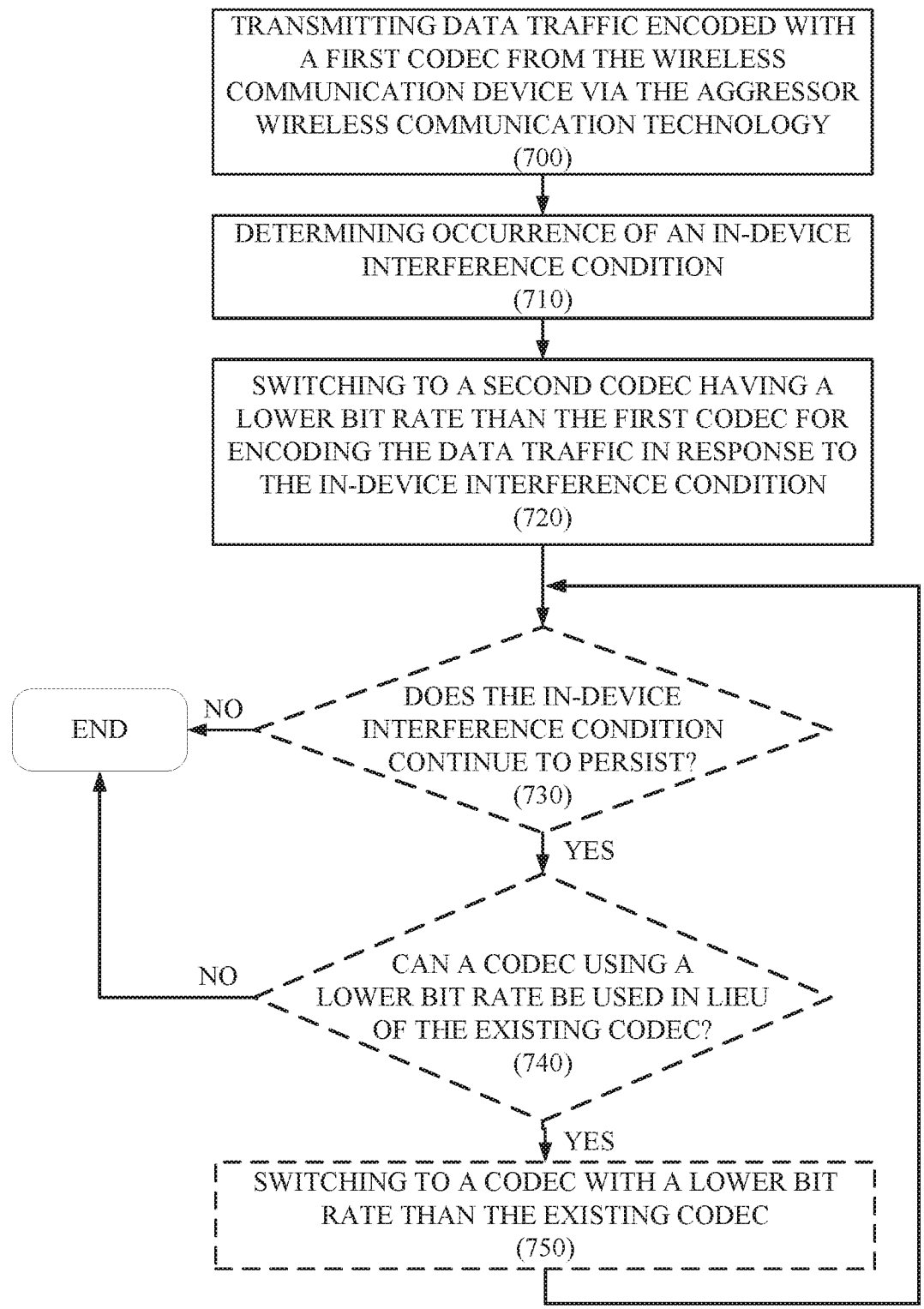
FIG. 7 illustrates a flowchart according to a further example method for facilitating in-device coexistence between wireless communication technologies according to some example embodiments.

FIG. 7 illustrates a flowchart according to an example method for facilitating in-device coexistence between wireless communication technologies according to some example embodiments in which a codec can be changed to reduce the bit rate of aggressor data traffic. Operation 700 can include transmitting data traffic encoded with a first codec from the wireless communication device 100 via the aggressor wireless communication technology. In this regard, operation 700 can correspond to an embodiment of operation 500 and/or operation 600 in which transmitted data traffic can be codec encoded. The data traffic can be transmitted via the aggressor technology communication interface 116. Operation 710 can include the data traffic control module 120 determining an occurrence of an in-device interference condition. This determination can, for example, be made based at least in part on a measurement and/or other indication that can be reported by the victim technology communication interface 118. Operation 720 can include the data traffic control module 120 reducing the bit rate of the data traffic transmitted via the aggressor wireless communication technology by switching to a second codec having a lower bit rate than the first codec for encoding the data traffic in response to the in-device interference condition. In this regard operation 720 can, for example, correspond to an embodiment of operation 500 in which the bit rate of transmitted data traffic can be reduced at least in part by switching codecs. In some example embodiments, operation 620 and/or operation 650 can implement an embodiment of operation 720, such that a bit rate of a traffic classification can be reduced by switching a codec that can be used for the traffic classification.

In some example embodiments, the method can conclude following performance of operation 720. However, in some example embodiments reduction in bit rate of aggressor data traffic can be performed incrementally. In this regard, following switching to the second codec, it can be determined whether the in-device interference condition continues to persist and, if so, the bit rate can be further reduced by switching to another codec having a lower bit rate than the second codec. In such embodiments, the method can accordingly proceed to operation 730, which can include the data traffic control module 120 determining whether the in-device interference condition continues to persist. If the in-device interference condition does not continue to persist following the reduction in bit rate of operation 720, then the method can terminate. If, however, the in-device interference condition does continue to persist, then the method can proceed to operation 740, which can include determining whether a codec using a lower bit rate can be used in lieu of the existing codec being used to encode data traffic transmitted via the aggressor wireless communication technology. In this regard, there can be constraints in some instances on whether a particular codec can be used to encode data traffic. For example, a QoS guarantee that may be enforced for data traffic can impose a minimum floor level of bit rate. Such a constraint can accordingly prevent a codec from being used if the codec does not support the guaranteed QoS. As another example, all available codecs may have been exhausted and there may not have be an available codec having a lower bit rate than an existing codec.

If it is determined at operation 740 that a codec using a lower bit rate cannot be used in lieu of the current bit rate, then the method can terminate. If, however, a codec using a lower bit rate can be used, then the method can proceed to operation 750, which can include the data traffic control module 120 switching to a codec using a lower bit rate than the current codec.

Following performance of operation 750, the method can optionally return to operation 730. In this regard, in some embodiments, the bit rate of the data traffic can be incrementally reduced by progressively switching (e.g., downgrading) codecs until either the in-device interference condition no longer exists, or until a codec having a lower bit rate can not be substituted for an existing codec.

It will be appreciated that the methodology illustrated in FIG. 7 can be used in combination with the methodology used in FIG. 6. For example, the bit rate of a traffic classification can be reduced by switching codecs. As another example, in some example embodiments, multiple codecs using progressively lower bit rates can be sequentially used for reducing a bit rate of data traffic in a first traffic classification if an in-device interference condition continues to persist following first switching codecs before reducing a bit rate of a second traffic classification having a higher priority.

In some example embodiments, the bit rate of traffic transmitted via the aggressor wireless communication technology can be increased following mitigation of an in-device interference condition. In some such example embodiments, the bit rate can be returned to a rate used before occurrence of the in-device interference condition in a single step. Alternatively, in some such example embodiments, the bit rate can be incrementally increased in steps. For example, the bit rate can be increased incrementally until either the bit rate used prior to occurrence of the in-device interference condition is reached or until the in-device interference condition reoccurs due to an increase in bit rate. Any methodology that can be used to decrease the bit rate can be used to increase the bit rate after mitigation of the in-device interference condition. For example, a codec using a higher bit rate can be used, the bit rate of data provided to a protocol stack for transmission can be increased, some combination thereof, and/or other methodology can be used to increase the bit rate.

Figure 8:
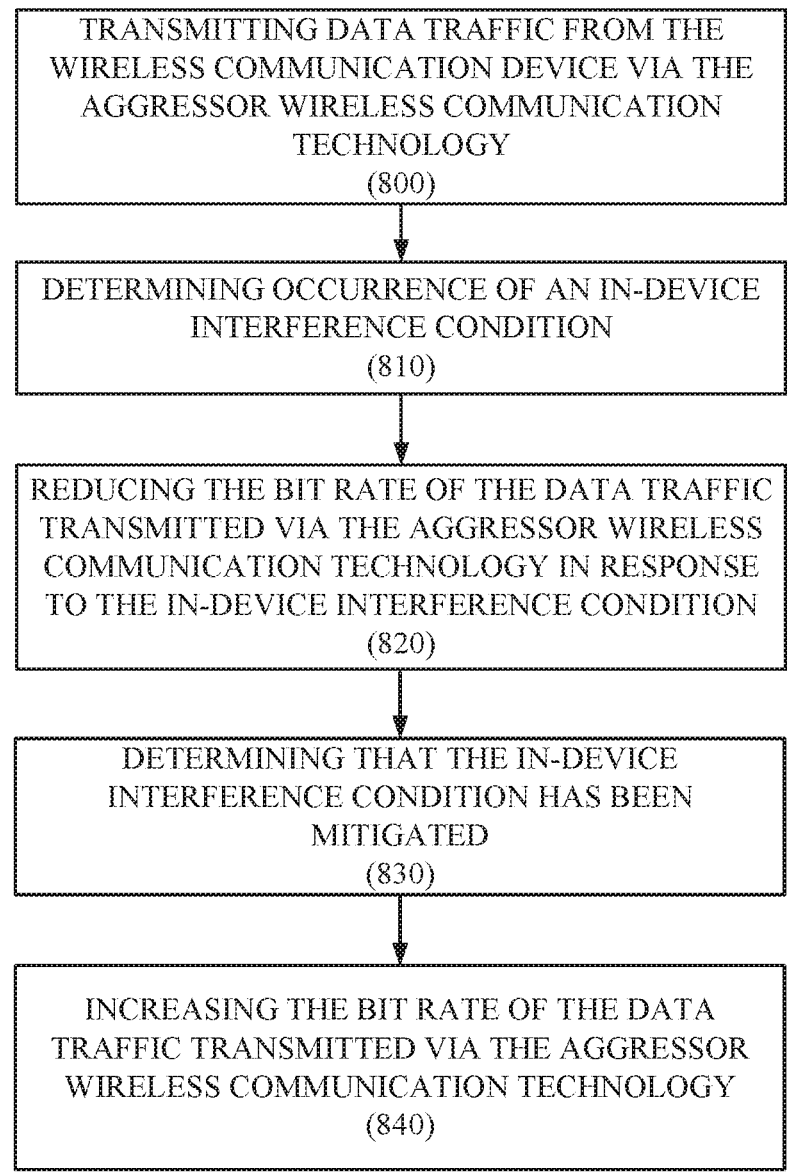
FIG. 8 illustrates a flowchart according to an example method for increasing a bit rate of data traffic following mitigation of an in-device interference condition according to some example embodiments.

FIG. 8 illustrates a flowchart according to an example method for increasing a bit rate of data traffic following mitigation of an in-device interference condition according to some example embodiments. Operation 800 can include transmitting data traffic from the wireless communication device 100 via the aggressor wireless communication technology. In this regard, data traffic can be transmitted via the aggressor technology communication interface 116. Operation 800 can accordingly, for example, correspond to one or more of operations 500, 600, and 700. Operation 810 can include the data traffic control module 120 determining an occurrence of an in-device interference condition. This determination can, for example, be made based at least in part on a measurement and/or other indication that can be reported by the victim technology communication interface 118. Operation 820 can include the data traffic control module 120 reducing the bit rate of the data traffic transmitted via the aggressor wireless communication technology in response to the in-device interference condition. As such, operation 820 can correspond to an embodiment of one or more of operations 520, 620, and 720. Operation 830 can include the data traffic control module 120 determining that the in-device interference condition has been mitigated. Operation 840 can include the data traffic control module 120 increasing he bit rate of the data traffic transmitted via the aggressor wireless communication technology in response to mitigation of the in-device interference condition.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A wireless device comprising:
   a first wireless interface configurable to communicate in accordance with a first radio access technology (RAT);
   a second wireless interface configurable to communicate in accordance with a second RAT; and
   processing circuitry communicatively coupled to the first and second wireless interfaces and configured to cause the wireless device to:
   determine occurrence of an in-device interference condition resulting from transmission of data traffic via the first wireless interface; and
   adjust a property of at least a portion of data traffic transmitted via the first wireless interface in response to the in-device interference condition,
   wherein the wireless device determines occurrence of the in-device interference condition based on a comparison of measurements performed by the second wireless interface when data traffic is transmitted via the first wireless interface and when no data traffic is transmitted via the first wireless interface.

2. The wireless device as recited in claim 1, wherein the measurements comprise observed data error rates for data traffic received via the second wireless interface.

3. The wireless device as recited in claim 1, wherein the measurements comprise observed noise floors for the second wireless interface.

4. The wireless device as recited in claim 1, wherein the wireless device adjusts the property of the at least a portion of the data traffic transmitted via the first wireless interface at least in part by reducing a bit rate of the at least a portion of the data traffic.

5. The wireless device as recited in claim 4, wherein reducing the bit rate results in a reduction in transmission power via the first wireless interface.

6. The wireless device as recited in claim 4, wherein reducing the bit rate results in at least one additional time gap in data traffic transmitted via the first wireless interface.

7. The wireless device as recited in claim 1, wherein the wireless device adjusts the property of the at least a portion of the data traffic transmitted via the first wireless interface at least in part by switching from using a first codec to using a second codec to encode the at least a portion of the data traffic.

8. The wireless device as recited in claim 7, wherein the second codec has a lower bit rate than the first codec.

9. The wireless device as recited in claim 1, wherein the processing circuitry is further configured to cause the wireless device to:
   determine whether the in-device interference condition persists after adjustment of the property of the at least a portion of the data traffic; and
   further adjust the property of the at least a portion of data traffic transmitted via the first wireless interface when the in-device interference condition persists.

10. An apparatus configurable for operation in a wireless device, the apparatus comprising processing circuitry configured to cause the wireless device to:
    determine occurrence of an in-device interference condition resulting from transmission of data traffic via a first wireless interface of the wireless device; and
    adjust a property of at least a portion of data traffic transmitted via the first wireless interface in response to the in-device interference condition,
    wherein the wireless device determines occurrence of the in-device interference condition based on a comparison of measurements performed by a second wireless interface when data traffic is transmitted via the first wireless interface and when no data traffic is transmitted via the first wireless interface.

11. The apparatus as recited in claim 10, wherein the measurements comprise observed data error rates for data traffic received via the second wireless interface.

12. The apparatus as recited in claim 10, wherein the measurements comprise observed noise floors for the second wireless interface.

13. The apparatus as recited in claim 10, wherein the wireless device adjusts the property of the at least a portion of the data traffic transmitted via the first wireless interface at least in part by reducing a bit rate of the at least a portion of the data traffic.

14. The apparatus as recited in claim 13, wherein reducing the bit rate results in a reduction in transmission power via the first wireless interface.

15. The apparatus as recited in claim 13, wherein reducing the bit rate results in at least one additional time gap in data traffic transmitted via the first wireless interface.

16. The apparatus as recited in claim 10, wherein the wireless device adjusts the property of the at least a portion of the data traffic transmitted via the first wireless interface at least in part by switching from using a first codec to using a second codec to encode the at least a portion of the data traffic.

17. The apparatus as recited in claim 16, wherein the second codec has a lower bit rate than the first codec.

18. The apparatus as recited in claim 10, wherein the processing circuitry is further configured to cause the wireless device to:
 determine whether the in-device interference condition persists after adjustment of the property of the at least a portion of the data traffic; and
 further adjust the property of the at least a portion of data traffic transmitted via the first wireless interface when the in-device interference condition persists.

19. A method for managing in-device interference between wireless interfaces of a wireless device, the method comprising:
 by the wireless device:
  determining occurrence of an in-device interference condition resulting from transmission of data traffic via a first wireless interface of the wireless device; and
  adjusting a property of at least a portion of data traffic transmitted via the first wireless interface in response to the in-device interference condition,
 wherein the wireless device determines occurrence of the in-device interference condition based on a comparison of measurements performed by a second wireless interface when data traffic is transmitted via the first wireless interface and when no data traffic is transmitted via the first wireless interface.

20. The method as recited in claim 19, wherein the wireless device adjusts the property of the at least a portion of the data traffic transmitted via the first wireless interface at least in part by reducing a bit rate of the at least a portion of the data traffic.

* * * * *